L. A. SHELDON.
FLOW METER.
APPLICATION FILED DEC. 13, 1913.

1,119,648.

Patented Dec. 1, 1914.

Witnesses:
Marcus L. Byng.
J. Ellis Glen.

Inventor:
Lucian A. Sheldon,
by
His Attorney.

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

FLOW-METER.

1,119,648.  Specification of Letters Patent.  Patented Dec. 1, 1914.

Application filed December 13, 1913. Serial No. 806,412.

*To all whom it may concern:*

Be it known that I, LUCIAN A. SHELDON, a citizen of the United States, residing at Schenectady, county of Schenectady, State of New York, have invented certain new and useful Improvements in Flow-Meters, of which the following is a specification.

My invention relates to flow meters and particularly to such instruments wherein motion is transmitted from the element which moves responsive to changes in the rate of flow to the indicating element or pointer through the instrumentality of a suitable magnet or magnets. In such a motion transmitting means a magnet is mounted inside and adjacent a wall of the flow meter casing, to which magnet movement is transmitted through suitable mechanism by variations in the rate of flow of the fluid being metered. Either the entire casing or the portion thereof adjacent the magnet is constructed of non-magnetic material and suitably mounted outside the casing and opposite the magnet is a second magnet which, due to magnetic action, moves in union with the magnet in the casing.

In order to insure accuracy in the reading of the instrument, it is essential that there be relatively strong magnetic action between the magnet inside the casing and the magnet outside, and heretofore in cases where the reluctance of the magnetic path was relatively great, due to the distance apart of the magnets, it has been necessary to use quite powerful magnets.

Occasions when the magnetic path between the magnet inside the casing and the magnet outside is relatively long may arise due to the desirability of placing the pointer or indicating element some little distance from the casing, or due to the necessity of constructing the wall of the casing of relatively thick material as in cases where fluid under high pressure is being metered.

The object of the present invention is to provide means for reducing the magnetic reluctance of the path between the magnet inside the casing and the magnet outside whereby even though the distance therebetween be relatively great it is unnecessary to use more powerful magnets in order to obtain the desired magnetic action. To this end I provide means for decreasing the magnetic reluctance of the path between the magnets which means may take the form of pins of magnetic material and of low magnetic reluctance, having one end embedded in the casing and arranged in the path of the magnetic flux.

Figure 1:
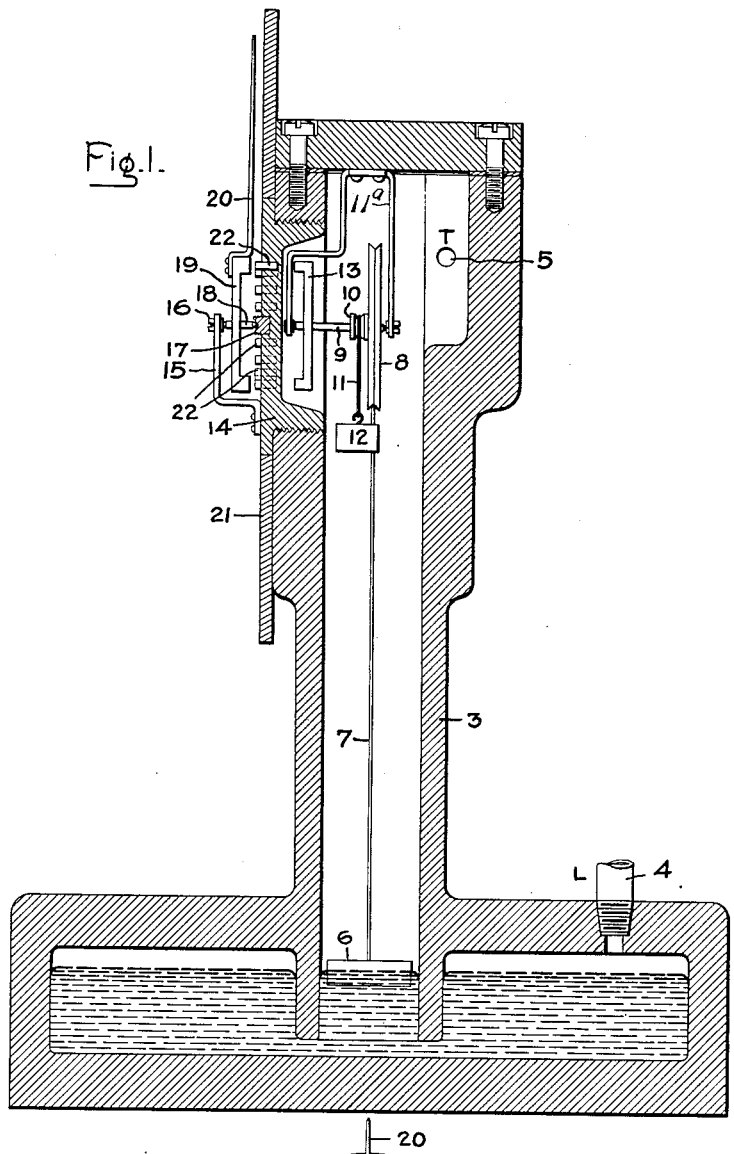
Figure 2:
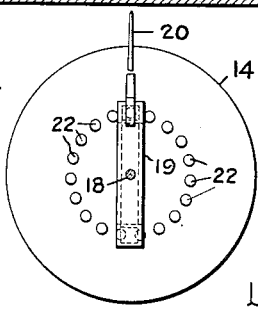

In the accompanying drawing which illustrates an embodiment of my invention, Figure 1 is a sectional view of a flow meter embodying my improvements, and Fig. 2 is a face view showing the arrangement of the magnetic pins.

I have illustrated a flow meter of the U-tube mercury type, the casing 3 of which is provided with the openings 4 and 5 into which are connected the leading and trailing pressure transmitting pipes as is customary and well known. The tube has a body of mercury therein upon which rides the float 6 suitably connected as by flexible cord, chain or other device 7 to the grooved wheel 8 carried by the pivot shaft 9. Mounted on this shaft is a small pulley wheel 10 to which is attached the cord 11 of the counter weight 12, which to a greater or less extent counterbalances the float 6.

The shaft 9 is shown as being pivoted in a frame 11ᵃ and upon the end thereof adjacent to a wall of the casing is mounted a magnet 13. This magnet is shown as being mounted at its center and having its ends turned toward the casing so as to direct the magnetic flux. In the present instance, the casing proper is illustrated as being made of magnetic material and having opposite the magnet 13 an opening into which is threaded a plug 14 of non-magnetic material, as copper. This plug is hollowed out to receive the magnet 13 so that the magnet is entirely surrounded except at the rear by non-magnetic material. Mounted on the plug is a bracket arm 15 supporting a bearing 16 between which, and a bearing 17 in plug 14 is mounted a shaft 18 carrying a second magnet 19 having inturned ends directly opposite the ends of the magnet 13. The magnet 19 carries a pointer 20 which plays over a suitable scale on the annular plate 21.

Located in the path of the magnetic flux between the inturned ends of the magnets 13 and 19 is a series of pins 22 formed of magnetic material, as soft iron. These pins 22 are inserted in holes bored part way through the face of the plug and are spaced apart sufficiently so as not to materially detract from the strength of the plug. The pins are illustrated as projecting slightly beyond the face of the plug 14, but this is only by way of example, as said pins might be flush with the surface of the plug or project quite some distance as found desirable in any particular case. In fact, in actual practice, these pins might be made of considerable length so that the magnet 19, pointer 20, and scale 21 could be located at some convenient and readily accessible point quite remote from the instrument proper, it being only necessary that the magnetic path through the pins be of greater permeability than that through the air. At the points where these pins are located the magnetic reluctance of the path is very much reduced so that at said points the lines of force tend to concentrate, and, therefore, in order to obtain a uniform movement of the magnet 19 in response to movements of magnets 13, I provide an odd number of equally spaced pins 22 as best shown in Fig. 2. Due to this arrangement there are no oppositely disposed pins and hence the opposite ends of the magnets 13 and 19 can never at the same time lie directly over two pins only. As a result the pull between the magnet 19 and magnet 13 will be substantially uniform at all points, and any tendency toward jerky or step by step movements, as would otherwise be the case, is obviated. I do not, however, desire to limit my invention to the use of a single row of pins of odd number, as I may use more than one row of pins, as for example, two rows or three rows, the pins of the respective rows being staggered with respect to each other. Under these circumstances it is not essential that I use an odd number in each row as practically a uniform magnetic path will be formed between the magnets in the annular path of the pins.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a movably mounted magnet, of a second movably mounted magnet spaced therefrom and adapted to follow the movements of the first magnet, a wall of non-magnetic material between the magnets, and means of relatively high permeability embedded in the wall in the path of the magnetic flux for reducing the reluctance of the magnetic path between the magnets.

2. The combination with a movably mounted magnet, of a second movably mounted magnet spaced therefrom and adapted to follow the movements of the first magnet, a wall of non-magnetic material between the magnets, and spaced pins formed of a material of relatively high permeability embedded in the wall in the path of the magnetic flux for reducing the reluctance of the magnetic path between the magnets.

3. The combination with a movably mounted magnet, of a second movably mounted magnet spaced therefrom and adapted to follow the movements of the first magnet, a wall of non-magnetic material between the magnets, and spaced pins formed of a material of relatively high permeability embedded in the wall in the path of the magnetic flux for reducing the reluctance of the magnetic path between the magnet and the member, there being an odd number of such pins for the purpose described.

4. The combination in a flow meter having at least a portion of its casing formed of non-magnetic material, of a magnet pivotally mounted within the casing adjacent the non-magnetic portion of the wall, means for transmitting movements to said magnet, a second magnet mounted outside the casing directly opposite to the first named magnet adapted to move in unison therewith, and pins of magnetic material having their ends embedded in the casing in the path of the flow of magnetic flux for reducing the reluctance of the magnetic path through the casing.

5. The combination in a flow meter having at least a portion of its casing formed of non-magnetic material, of a magnet pivotally mounted within the casing adjacent the non-magnetic portion of the wall, means for transmitting movements to said magnet, a second magnet mounted outside the casing directly opposite to the first named magnet adapted to move in unison therewith, and pins of magnetic material having their ends embedded in the casing in the path of the flow of magnetic flux for reducing the reluctance of the magnetic path through the casing, there being an odd number of such pins for the purpose described.

6. The combination of a casing having an opening, a plug of non-magnetic material therein, a bar magnet rotatably mounted at its center within the casing and adjacent the plug, means for rotating the magnet, pivot bearings carried by the plug on its outer face, a shaft mounted in said bearing, a second magnet on the shaft directly opposite the first named magnet and adapted to move in unison therewith, and spaced pins having their ends embedded in the plug and arranged in a circle in the path of the flow of magnetic flux.

In witness whereof, I have set my hand this 11th day of December, 1913.

LUCIAN A. SHELDON.

Witnesses:
 BENJAMIN B. HULL,
 MARGARET E. WOOLLEY.